United States Patent [19]

Dholakia et al.

[11] 4,145,718
[45] Mar. 20, 1979

[54] VIDEO DISC PICKUP WITH PREPLAY STYLUS

[75] Inventors: Anil R. Dholakia, East Windsor; John Alexander, Beverly, both of N.J.

[73] Assignee: RCA Corporation, New York, N.Y.

[21] Appl. No.: 941,135

[22] Filed: Sep. 11, 1978

Related U.S. Application Data

[63] Continuation of Ser. No. 781,301, Mar. 25, 1977.

[51] Int. Cl.$^2$ .............................................. G11B 3/80
[52] U.S. Cl. ........................... 358/128; 179/100.41 S
[58] Field of Search ............... 358/128; 179/100.41 G, 179/100.41 S, 100.1 R; 274/47

[56] References Cited

U.S. PATENT DOCUMENTS

| | | | |
|---|---|---|---|
| 2,754,372 | 7/1956 | Weathers | 179/100.41 G |
| 3,185,485 | 5/1965 | Brubaker | 274/47 |
| 3,572,725 | 3/1971 | Murphy | 274/47 |
| 3,817,538 | 6/1974 | Jenrick | 274/47 |
| 3,822,065 | 7/1974 | Arbib | 274/47 |
| 3,872,241 | 3/1975 | Adler | 358/128 |
| 3,956,581 | 5/1976 | Taylor | 358/128 |

FOREIGN PATENT DOCUMENTS

49-2893  12/1973  Japan .............................. 179/100.41 S

Primary Examiner—John H. Wolff
Attorney, Agent, or Firm—Eugene M. Whitacre; Joseph S. Tripoli; Dilip A. Kulkarni

[57] ABSTRACT

A composite stylus assembly, provided for a system for playing back a grooved disc record, includes an L-shaped leaf spring support member formed of a longitudinal piece and a short transverse piece. The transverse piece is attached near the free end of a pickup arm of the system such that the longitudinal piece will be substantially parallel to the pickup arm. The pickup arm is supported in a cartridge adapted for reception within a carriage of the system such that during record playback, the longitudinal piece will lie between the pickup arm and the center of a turntable of the playback system. A playback stylus, subject to engagement with the groove of a video disc record supported on the turntable, is carried at the free end of the pickup arm, while a pre-play stylus, subject to simultaneous engagement with several convolutions of the groove of the disc record, is carried at the free end of the longitudinal piece.

19 Claims, 4 Drawing Figures

U.S. Patent  Mar. 20, 1979  4,145,718
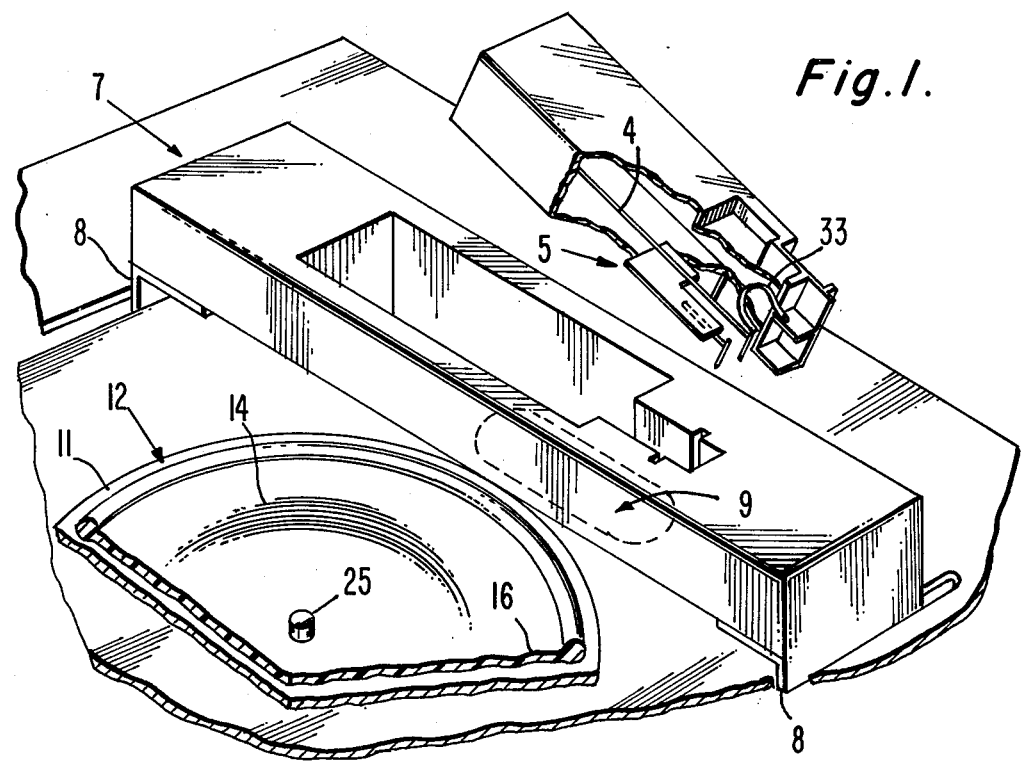
Fig.1.
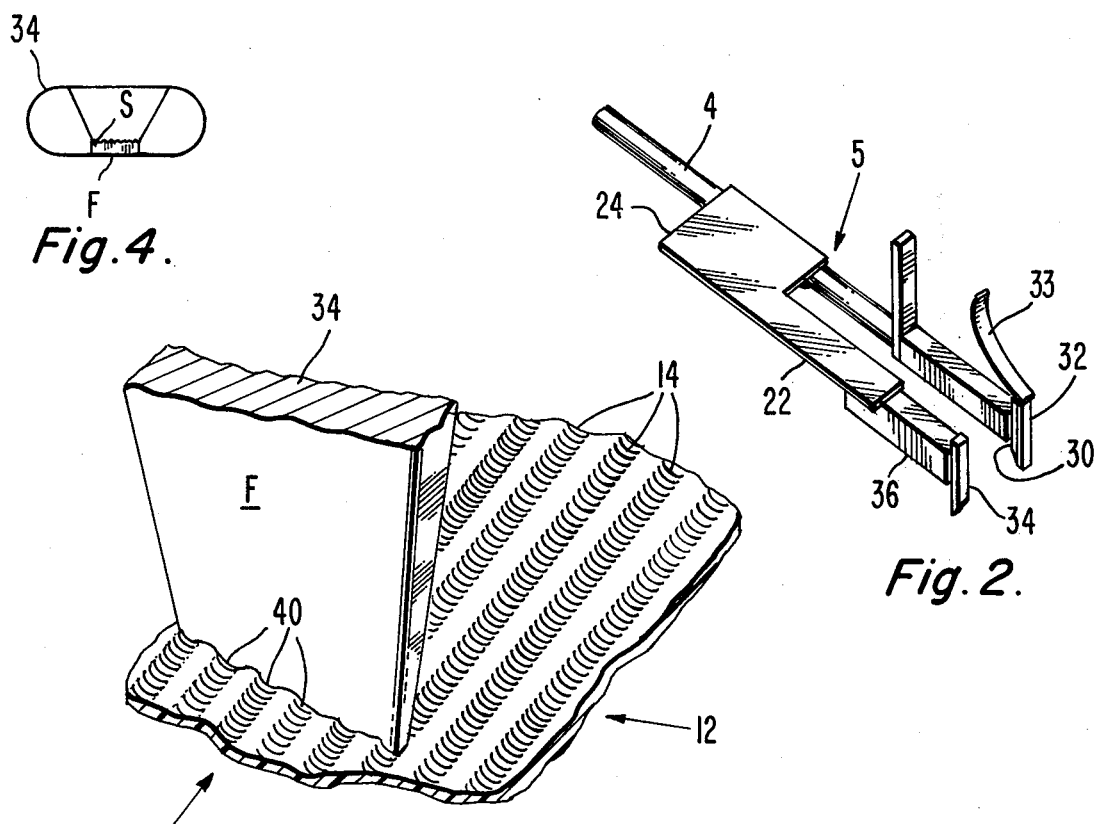
Fig.4.
Fig.2.
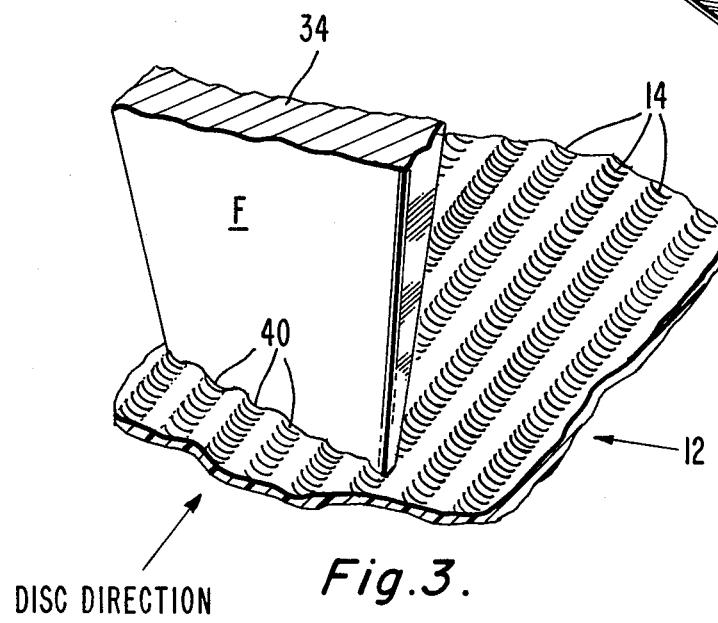
DISC DIRECTION
Fig.3.

VIDEO DISC PICKUP WITH PREPLAY STYLUS

This is a continuation of application Ser. No. 781,301, filed Mar. 25, 1977.

This present invention relates to video playback systems. More particularly, it relates to an arrangement of providing a composite stylus assembly, including a pre-play stylus, for the pickup arm in such systems.

In certain sophisticated information recording and playback systems, information is recorded in the bottom of a smooth spiral groove on the surface of a recording medium. High information packing densities in such systems are achieved by having groove densities in the order of four to eight thousand groove convolutions per inch.

One example of such a system is described in detail in U.S. Pat. No. 3,842,194, issued on Oct. 15, 1974, to Jon K. Clemens. Illustratively, the Clemens system employs a disc-shaped recording medium having video and audio information recorded by means of geometric variations in the bottom of a smooth spiral groove on the surface thereof. The groove is coated with a layer of conductive material which, in turn, is coated with a layer of a dielectric material. During record playback, information is recovered from the bottom of the groove by means of a signal pickup electrode, supported on a playback stylus mounted at one end of a pickup arm. The playback stylus engages the spiral groove and as relative motion is established between the disc and the electrode, an electrode-disc capacitance varies in response to the geometric variations in the bottom of the spiral groove passing beneath the electrode. The capacitance variations are converted to electrical signal variations by a suitable signal processing circuitry. coupled to the electrode.

One problem associated with the operation of an information recording and playback system of the above-described type to recover the recorded information is the presence of dust and debris particles in various regions of the disc groove. Playback stylus encounters with such dust and debris particles often result in the deflection of the playback stylus out of engagement with the bottom of the groove leading to momentary distress or loss of information signals. More severe encounters may result in the playback stylus skipping several groove convolutions at a time leading to the loss of plurality of frames of video information. Dust and debris particles in groove regions may also be responsible for locked groove incidents resulting in the playback stylus retracting the same path. Moreover, these encounters may result in the rapid wear of the disc and the signal pickup electrode (e.g., as the playback stylus lands on the rapidly rotating disc surface after being deflected).

It has been proposed to effect partial alleviation of the aforementioned problem by utilizing a preplay "scraper" stylus having a shoe portion which engages, in simulated playback, the smooth groove of the information record, prior to the actual playback of the record. It is believed that the pre-play stylus scrapes dust and debris particles off the groove walls and thereby effects a "cleaning" of the groove for the benefit of the playback stylus.

In accordance with the principles of the present invention, the aforesaid alleviation of dust and debris particles effect is advantageously realized by a pre-play stylus formed of a dielectric material (e.g., sapphire) which is carried by a compliant element attached to the pickup arm of the video system. The compliant element effects some decoupling of the styli, providing a measure of isolation for the playback stylus from the effects of pre-play stylus vibrations and thereby enhances the ability of the playback stylus to track the disc record groove. Furthermore, the pre-play stylus is carried by said compliant element such that both styli are along the same radial line of the turntable during record playback. This carrying position allows both styli to maintain their respective orientations relative to the groove surfaces as the styli move in the groove between convolutions which are near the edge of the disc and convolutions which are near the center of the disc.

In accordance with another aspect of the present invention, the shoe portion of the pre-play stylus is formed (e.g., by lapping on an abrasive disc having appropriate contours) in a shape providing a shoe with several groove engaging projecting areas or regions to enable the pre-play stylus to simultaneously engage more than one convolution of the disc record groove. By simultaneously engaging more than one groove convolution, the ability of the pre-play stylus to track the record groove is greatly enhanced since the effects of encounters with dust and debris particles in any one groove convolution will be reduced correspondingly to the increase in the number of groove convolutions engaged. Furthermore, the several groove engaging projecting areas of the shoe portion will successively pass through any one spot of the groove, as the pre-play stylus progresses towards the center of the disc, resulting in an enhancement of the ability of the pre-play stylus to alleviate the aforementioned dust and debris problem. This ameliorating effect is believed to result from the successive "scraping" of the groove walls by the groove engaging projecting areas.

In accordance with yet another aspect of the present invention, the pre-play stylus is formed so as to have a flat prow which vertically rides in the disc groove during playback. The flat prow is believed to enhance the ability of the pre-play stylus to dislodge dust and debris particles from the disc groove and to diminish the possibility of the pre-play stylus riding over such debris.

In accordance with another aspect of the present invention, the pre-play stylus is mounted, relative to the playback stylus, so that during set-down of the composite stylus assembly, the pre-play stylus will engage the disc record firstly. With the pre-play stylus in engagement with the record groove, the ability to achieve a smooth set-down for the playback stylus is improved with a concomitant diminution in the possibility of disc or stylus damage from stylus skipping or skidding over the disc surface.

In accordance with one illustrative embodiment of the present invention, the composite stylus assembly includes an L-shaped element comprising a longitudinal piece and a transverse piece. The free end of the transverse piece is attached near the free end of the pickup arm such that the longitudinal piece will be substantially parallel to the pickup arm with the free end of the longitudinal piece near the playback stylus. The pickup arm is supported in a carriage such that during record playback, the longitudinal piece will lie between the pickup arm and the center of a turntable of the system. A pre-play stylus, subject to engagement with the disc record groove during playback, is carried at the free end of the longitudinal piece.

The structure of the L-shaped element, formed of a flexible material (e.g., "mylar" polyester), limits its lateral compliance (with respect to the pickup arm) without affecting its compliance in a vertical direction (with respect to the plane in which the L-shaped element lies). This structural arrangement effects a decoupling of the styli in the vertical direction and thereby enhance the ability of the playback stylus to track the disc record groove.

In the accompanying drawings:

FIG. 1 is a partial perspective view of a video playback system incorporating a cartridge having a pickup arm provided with a composite stylus assembly embodying the present invention;

FIG. 2 is an enlarged perspective view of the composite stylus assembly of the embodiment of FIG. 1;

FIG. 3 is an enlarged perspective view illustrating the engagement of an embodiment of a pre-play stylus, incorporated in the composite stylus assembly of the embodiment of FIG. 1, having a wide shoe with disc record groove convolutions; and FIG. 4 is a bottom view of the wide shoe pre-play stylus of FIG. 3.

With reference to FIG. 1, a video playback system includes a cartridge 3 (a casing having walls defining a protective enclosure and having an opening in one of the walls) enclosing a pickup arm 4 pivotally supported by means of a compliant support at one end thereof to a sidewall of the cartridge 3, the free end of which supports a composite stylus assembly 5. The cartridge 3 is received in a compartment 6 of a box-like carriage 7 which is mounted to a support member 8 for movement between a standby position and playback positions. During playback, the pickup arm 4 passes through an opening 9 in a bottom wall of the carriage 7. Support member 8 is driven by a radial drive feed mechanism illustratively of a type described in U.S. Pat. No. 3,870,835, for F. R. Stave. Details of the cartridge 3 are described in copending U.S. application Ser. No. 667,308, filed Mar. 16, 1976, for Marvin Leedom, now U.S. Pat. No. 4,049,280.

The player system 2 further includes a turntable 11 supporting a video disc record 12 of a type having video information recorded by means of geometrical variations (not shown) in a spiral groove 14 on the surface thereof. The record 12, illustratively of a type shown in the aforementioned Clemens patent, includes a thin dielectric covering a conductive material which is disposed on the grooved surface of the disc (e.g., only a dielectric substrate 16 being shown).

With reference to FIGS. 1 and 2, the composite stylus assembly 5 includes an L-shaped support member comprising a longitudinal piece 22 and a transverse piece 24. The free end of the transverse piece 24 is attached near the free end of the pickup arm 4 such that the longitudinal piece 22 will be parallel to the pickup arm 4 and will extend in the direction of the free end thereof. The pickup arm 4 is supported in the carriage 7 such that, during record playback, the transverse piece will lie between the pickup arm and the axis 25 of the turntable. The free end of the pickup arm carries a playback stylus 30, formed from a dielectric material such as sapphire, supporting a conductive electrode 32 (shown in FIG. 2). During record playback, the shoe portion of the playback stylus 30 engages the groove 14 enabling the electrode 32 to cooperate with the conductive material and dielectric coating on the disc record to form a capacitance. The electrode 32 is electrically coupled to signal processing circuitry (not shown) by means of a leaf spring 33, in the form of a conductive ribbon which also subjects the composite stylus assembly 5 to a tracking force of approximately 130 miligrams.

A pre-play stylus 34, of the same mass as the playback stylus 30, is supported on a plastic mount 36 attached to the free end of the longitudinal piece 22. The styli are arranged on the assembly 5, the one with respect to the other, such that they are substantially parallel with the shoe portion of the pre-play stylus 34 being slightly lower (approx. 30 mil) when the pickup arm is freely suspended with the styli tips pointing downwardly. This positioning insures that as the pickup arm is lowered, such as by means of a lowering mechanism disclosed in copending U.S. application, Ser. No. 667,309, filed in the name of Bleazey, et al., now U.S. Pat. No. 4,053,161, the pre-play stylus will engage the groove of the disc record firstly. With the pickup arm at a fully lowered position both with styli simultaneously engage different convolutions of the groove. During playback operations, the tracking force provided by the leaf spring 33 effectively divides between the playback stylus 30 and the preplay stylus 34, so that the playback stylus is subjected to a downward force of approximately 90 milligrams and the preplay stylus is subjected to a downward force of approximately 40 milligrams.

With reference now to FIG. 3, the pre-play stylus 34 is shown in engagement with several convolutions of the groove 14. The pre-play stylus 34 is formed so as to have a flat prow F which is vertically disposed with respect to the disc surface during playback. Projecting areas 40, formed by lapping the shoe portion of the pre-play stylus on an abrasive disc having contours corresponding to the video disc contours, engage respective groove convolutions of the disc. With disc motion as indicated in FIG. 3, the pre-play stylus presents the surface F to on-coming debris particles carried by the disc 12.

FIG. 4 shows a bottom view of the pre-play stylus 34 clearly illustrating the shoe portion S thereof which is contoured to mate with a portion of the information bearing surface of the video disc. The pre-play stylus may be formed generally in the same manner as the playback stylus from a dielectric material (e.g. sapphire) and is provided with a tip formed with a tapering, flat front surface F, having converging straight edges which terminate at a front edge of the rectangular shoe portion S while sides of the tip upwardly extend in diverging fashion from side edges of the shoe portion S. The pre-play stylus tip is further provided with converging straight edges which terminate at the rear edge of the rectangular shoe portion.

What is claimed is:

1. Playback apparatus for use with a high density information record, such as a video disc or the like, having a spiral groove formed on a major surface thereof, which groove includes an information track; said apparatus comprising:
    (A) a playback stylus including an elongated rigid element tapering to a tip at one end thereof, which tip is dimensioned for reception within said groove;
    (B) a preplay stylus separate from said playback stylus and including an elongated rigid element tapering to a tip at one end thereof, which tip is provided with a plurality of projecting regions respectively dimensioned for reception within adjacent regions of said groove; said elongated rigid elements being fabricated from materials having comparable rigidity;

(C) a turntable for supporting such a disc record;

(D) means for supporting said playback stylus and said preplay stylus in playing positions permitting entry of said playback stylus tip and said preplay stylus projecting regions into said record groove to a depth, wherein said respective tip and projecting regions engage respective portions of said record groove; said supporting means including further means for providing sufficient independence of motion in the vertical direction between said styli such that disturbances in the vertical position of said preplay stylus during playback due to surface conditions in said record groove have substantially little effect on the vertical position of said playback stylus; said supporting means providing a substantially fixed lateral spacing between said styli; and (E) turntable rotating means for establishing relative motion between said disc groove and said styli in said playing positions to permit recovery of said information by said playback stylus;

wherein said preplay stylus permits removal of dust and debris from said groove prior to arrival of said playback stylus; and wherein simultaneous engagement of said pre-play stylus with several groove convolutions aids proper radial tracking by said playback stylus.

2. Apparatus in accordance with claim 1 wherein said preplay stylus is subject to a tracking force which is substantially less than the tracking force to which said playback stylus is subject to, when said relative motion between said record groove and said styli is established during playback with said styli in said playing positions.

3. Apparatus in accordance with claim 1 wherein said styli are supported by said supporting means so as to be aligned along the same radial line of said turntable, when disposed in said playing positions.

4. A pickup apparatus for use with a high density information record, such as a video disc or the like, having an information bearing groove disposed on the surface thereof; said apparatus comprising:

(A) a playback stylus including an elongated rigid element tapering to a tip at one end thereof, which tip is dimensioned for reception within said groove;

(B) a preplay stylus separate from said playback stylus and including an elongated rigid element tapering to a tip at one end thereof, which tip is provided with a plurality of projecting regions respectively dimensioned for reception within adjacent regions of said groove; said elongated rigid elements being fabricated from materials having comparable rigidity; and (C) means for supporting said playback stylus and said preplay stylus in playing positions permitting entry of said playback stylus tip and said preplay stylus projecting regions into said record groove to a depth, wherein said respective tip and projecting regions engage respective portions of said record groove; said supporting means including further means for providing sufficient independence of motion in the vertical direction between said styli such that disturbances in the vertical position of said preplay stylus during playback due to surface conditions in said record groove have substantially little effect on the vertical position of said playback stylus;

said supporting means providing a substantially fixed lateral spacing between said styli;

wherein said preplay stylus permits removal of dust and debris from said groove prior to arrival of said playback stylus; and wherein simultaneous engagement of said preplay stylus with several groove convolutions aids proper radial tracking by said playback stylus.

5. Apparatus in accordance with claim 4, wherein said supporting means additionally serves to maintain a substantially fixed lateral spacing between said styli, while allowing said independence of motion between said styli in the vertical direction.

6. Apparatus in accordance with claim 5 wherein said supporting means includes a pickup arm and an L-shaped member comprising a longitudinal portion and a transverse portion; the free end of said transverse portion being secured to said pickup arm such that the respective free ends of said longitudinal portion and said pickup arm are radially aligned; said playback stylus and said preplay stylus being respectively supported at the free ends of said pickup arm and said longitudinal portion.

7. Apparatus in accordance with claim 6 wherein the vertical compliance of said longitudinal portion is greater than the vertical compliance of said pickup arm.

8. A pickup apparatus for use with a high density information record, such as a video disc or the like, having an information bearing groove disposed on the surface thereof; said apparatus comprising:

(A) a casing having walls defining a protective enclosure and having an opening in one of said walls;

(B) a playback stylus including an elongated rigid element tapering to a tip at one end thereof, which tip is dimensioned for reception within said groove;

(C) a preplay stylus separate from said playback stylus and including an elongated rigid element tapering to a tip at one end thereof, which tip is provided with a plurality of projecting regions respectively dimensioned for reception within adjacent regions of said groove; said elongated rigid elements being fabricated from materials having comparable rigidity; and (D) means for supporting said styli within said casing and for permitting said styli to protrude through said opening for record groove engagement during playback; said supporting means including further means for providing sufficient independence of motion in the vertical direction between said styli such that disturbances in the vertical position of said preplay stylus during playback due to surface conditions in said record groove have substantially little effect on the vertical position of said playback stylus;

said supporting means providing a substantially fixed lateral spacing between said styli;

wherein said preplay stylus permits removal of dust and debris from said groove prior to arrival of said playback stylus; and wherein simultaneous engagement of said preplay stylus with several groove convolutions aids proper radial tracking by said playback stylus.

9. Apparatus in accordance with claim 8 wherein said preplay stylus element is provided with a truncated tip having a substantially flat face which upwardly extends from an edge of said truncated tip.

10. Apparatus in accordance with claim 8 wherein said supporting means additionally serves to maintain a substantially fixed lateral spacing between said styli, while allowing said independence of motion between said styli in the vertical direction.

11. Apparatus in accordance with claim 10 wherein said supporting means includes a pickup arm and an L-shaped member comprising a longitudinal portion and a transvers portion; the free end of said transverse portion being secured to said pickup arm such that the respective free ends of said longitudinal portion and said pickup arm are radially aligned; said playback stylus and said preplay stylus being respectively supported at the free ends of said pickup arm and said longitudinal portion.

12. An apparatus in accordance with claim 11 further including a leaf spring having its ends respectively secured to the free end of said pickup arm and the body of said casing for urging said playback stylus and said preplay stylus into said record groove during playback.

13. An apparatus as defined in claim 12 wherein the total tracking force provided by said leaf spring effectively divides itself between said playback stylus and preplay stylus such that the tracking force of said preplay stylus is substantially less than the tracking force of said playback stylus.

14. A pickup apparatus for use with a high density information record, such as a video disc or the like, having an information bearing groove disposed on the surface thereof; said apparatus comprising:
(A) a playback stylus including an elongated rigid element having a substantially flat surface tapering to a tip at one end thereof, which tip is dimensioned for reception within said groove;
(B) a prepaly stylus separate from said playback stylus and also including an elongated rigid element having a substantially flat surface tapering to a tip at one end thereof, which tip is provided with a plurality of projecting regions respectively dimensioned for reception within adjacent regions of said groove; said elongated rigid elements being fabricated from materials having comparable rigidity; and
(C) means for supporting said styli permitting entry of said playback stylus tip and said preplay stylus projecting regions into said record groove to a depth, wherein said respective top and projecting regions engage respective portions of said record groove; said supporting means disposing said preplay stylus such that said substantially flat surface of said preplay stylus is arranged forwardly thereof and substantially perpendicularly to said record surface; said supporting means including further means for providing sufficient independence of motion in the vertical direction between said styli such that disturbances in the vertical position of said preplay stylus during playback due to surface conditions in said record groove have substantially little effect on the vertical position of said playback stylus;

said supporting means providing a substantially fixed lateral spacing between said styli;

wherein said preplay stylus permits removal of dust and debris from said groove prior to arrival of said playback stylus; and wherein simultaneous engagement of said preplay stylus with several groove convolutions aids proper radial tracking by said playback stylus.

15. Apparatus in accordance with claim 14 wherein said substantially flat surface of said playback stylus is provided with a layer of conductive material defining an electrode.

16. Apparatus in accordance with claim 14 wherein said supporting means additionally serves to maintain a substantially fixed lateral spacing between said styli, while allowing said independence of motion between said styli in the vertical direction.

17. Apparatus in accordance with claim 16 wherein said supporting means includes a pickup arm and an L-shaped member comprising a longitudinal portion and a transverse portion; the free end of said transverse portion being secured to said pickup arm such that the respective free ends of said longitudinal portion and said pickup arm are radially aligned; said playback stylus and said preplay stylus being respectively supported at the free ends of said pickup and said longitudinal portion.

18. Apparatus in accordance with claim 17 wherein the vertical compliance of said longitudinal portion is greater than the vertical compliance of said pickup arm.

19. Apparatus in accordance with claim 18 wherein said preplay stylus is subject to a tracking force which is substantially less than the tracking force to which said playback stylus is subject to, when said relative motion between said record groove and said styli is established during playback with said styli in said playing positions.

* * * * *

UNITED STATES PATENT AND TRADEMARK OFFICE
CERTIFICATE OF CORRECTION

PATENT NO. : 4,145,718

DATED : March 20, 1979

INVENTOR(S): Anil R. Dholakia, et al.

It is certified that error appears in the above-identified patent and that said Letters Patent is hereby corrected as shown below:

Column 1, Line 51 - change "retracting" to -- retracing --

Column 7, line 7 - change "transvers" to -- transverse --

Column 7, line 45 - change "top" to -- tip -- .

Signed and Sealed this

Twenty-third Day of October 1979

[SEAL]

Attest:

RUTH C. MASON
*Attesting Officer*

LUTRELLE F. PARKER
*Acting Commissioner of Patents and Trademarks*